US009940601B2

(12) United States Patent
Hubner et al.

(10) Patent No.: US 9,940,601 B2
(45) Date of Patent: Apr. 10, 2018

(54) REMOTE SIGNING FOR A DELIVERY FROM ANYWHERE

(71) Applicant: Verizon Patent and Licensing Inc., Basking Ridge, NJ (US)

(72) Inventors: Paul V. Hubner, McKinney, TX (US); Steven T. Archer, Dallas, TX (US); Robert A. Clavenna, II, Lucas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 602 days.

(21) Appl. No.: 14/193,778

(22) Filed: Feb. 28, 2014

(65) Prior Publication Data

US 2015/0199643 A1    Jul. 16, 2015

Related U.S. Application Data

(60) Provisional application No. 61/927,345, filed on Jan. 14, 2014.

(51) Int. Cl.
*G06Q 10/08*    (2012.01)

(52) U.S. Cl.
CPC ............................. *G06Q 10/0833* (2013.01)

(58) Field of Classification Search
CPC ..................................................... G06Q 30/00
USPC ........................................................ 705/333
See application file for complete search history.

(56) References Cited

U.S. PATENT DOCUMENTS

| 6,434,158 | B1 * | 8/2002 | Harris | G06Q 20/40 235/472.01 |
|---|---|---|---|---|
| 7,248,160 | B2 * | 7/2007 | Mangan | G06Q 10/08 340/539.13 |
| 8,473,326 | B1 * | 6/2013 | Griffith | G06Q 30/0203 701/410 |
| 2012/0030133 | A1 * | 2/2012 | Rademaker | G06Q 10/08 705/333 |
| 2013/0066744 | A1 * | 3/2013 | Higgins | G06Q 10/0833 705/26.41 |
| 2015/0081583 | A1 * | 3/2015 | Butler | G06Q 10/0833 705/333 |

* cited by examiner

*Primary Examiner* — Michael Tomaszewski (57) ABSTRACT

A system may obtain courier location information associated with a package to be delivered, by a courier, to a delivery location associated with a customer. The courier location information may indicate that the customer is not available at the delivery location. The system may obtain delivery location information associated with the delivery location. The system may determine that the courier location information matches the delivery location information. The system may provide, to a customer device associated with the customer, a delivery notification based on determining that the courier location information matches the delivery location information. The system may receive a customer signature based on providing the delivery notification. The customer signature may be associated with the customer. The system may provide the customer signature. The customer signature being provided to inform the courier to deliver the package while the customer is not available at the delivery location.

20 Claims, 9 Drawing Sheets

REMOTE SIGNING FOR A DELIVERY FROM ANYWHERE

RELATED APPLICATION

This application claims priority under 35 U.S.C. § 119 based on U.S. Provisional Patent Application No. 61/927,345 filed on Jan. 14, 2014, the content of which is incorporated by reference herein in its entirety.

BACKGROUND

A courier, employed by a courier company, may attempt to deliver a package to a delivery location associated with a customer (e.g., a customer home, a customer office, etc.). The courier company may operate within a variety of geographic scales, such as a local scale (e.g., a town, a city, etc.), a regional scale (e.g., a county, a state, etc.), a national scale, or an international scale.

DETAILED DESCRIPTION OF THE PREFERRED EMBODIMENTS

The following detailed description of example implementations refers to the accompanying drawings. The same reference numbers in different drawings may identify the same or similar elements.

A courier, associated with a courier company, may arrive at a delivery location associated with a customer (e.g., a customer home, a customer office, etc.) to attempt to deliver a package to the customer. However, the courier may attempt to deliver the package while the customer is not available at the delivery location (e.g., while the customer is not home, while the customer is out of the office, etc.). Moreover, the courier may require a customer signature, associated with the customer, in order to leave the package at the delivery location. As such, the courier may be unable to deliver the package in the event that the customer is not available at the delivery location. Implementations described herein may allow a customer to sign for a delivery (e.g., of a package from a courier company) to a delivery location, associated with the customer, from any geographic location. Implementations described herein may also provide dual verification and/or confirmation that the package is at the delivery location and that the customer is willing to receive the package even though the customer is not available at the delivery location.

Figure 1A:
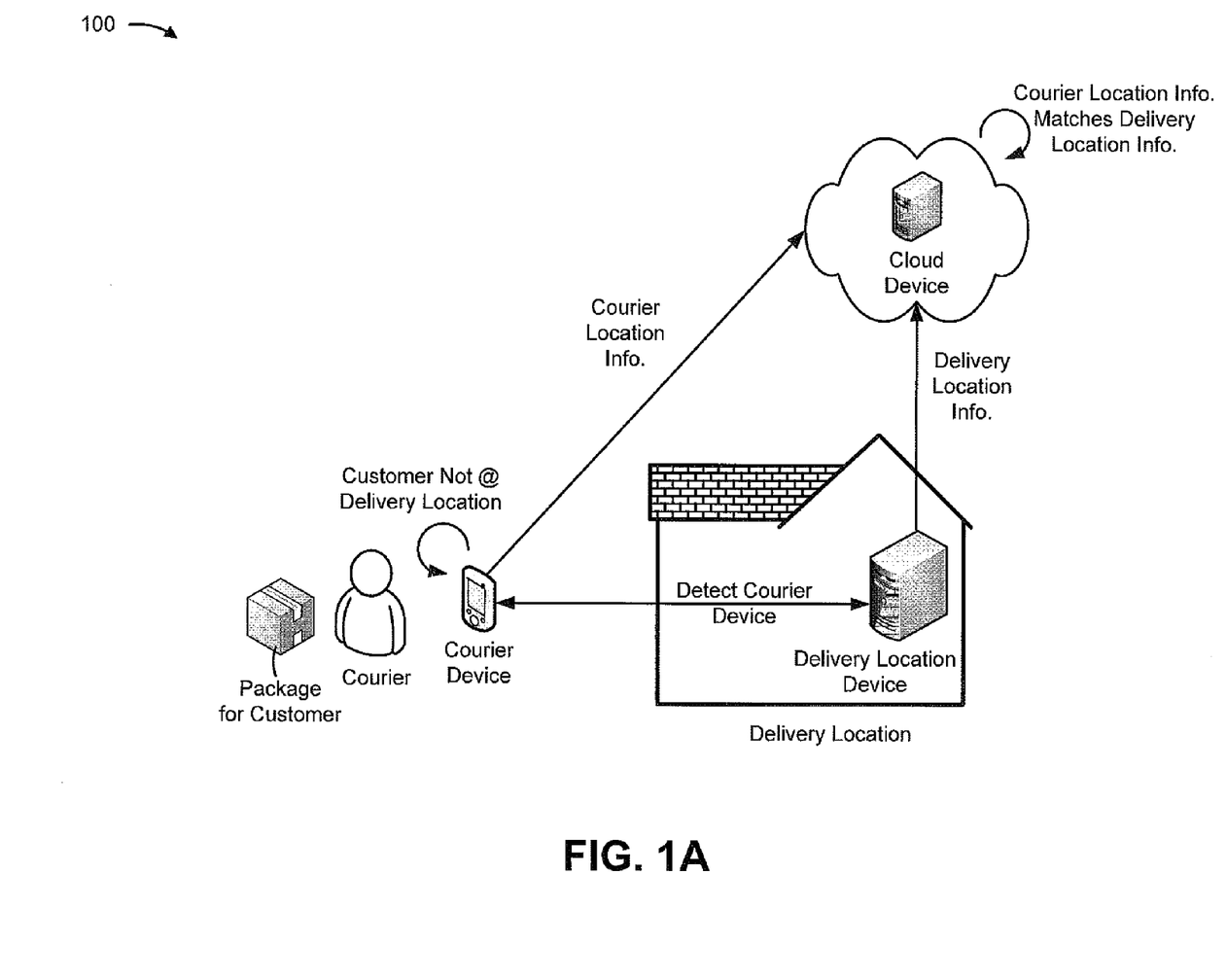
FIGS. 1A and 1B are diagrams of an overview of an example implementation described herein.
Figure 1B:
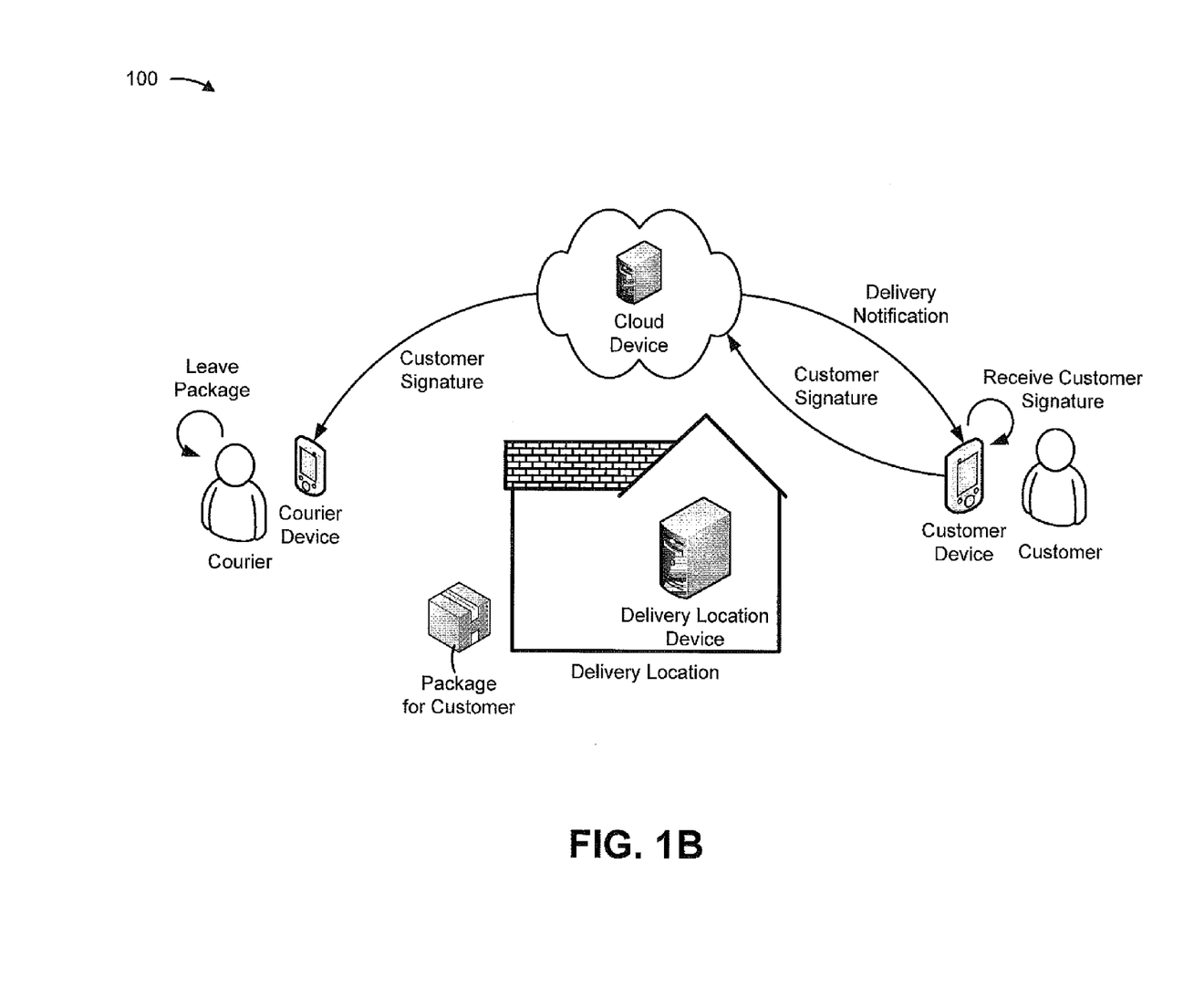

FIGS. 1A and 1B are diagrams of an overview of an example implementation 100 described herein. For the purposes of example implementation 100, assume that a courier, associated with a courier company, arrives at a delivery location, associated with a customer, to deliver a package to the customer. Further, assume that the customer is not available at the delivery location. Finally, assume that the courier requires a customer signature (e.g., a handwritten signature, an electronic signature, etc.), associated with the customer, in order to leave the package at the delivery location.

As shown in FIG. 1A, a courier device, associated with the courier, may determine (e.g., based on input from the courier) that the customer is not available at the delivery location. As shown, the courier device may generate courier location information, associated with the courier device, and may provide the courier location information (e.g., via a courier company device) to a cloud device included in a cloud network. The courier location information may include information indicating a geographic location at which the courier device is located (e.g., a set of global position system (GPS) coordinates, a street address, a building number, a floor number, a unit number, a room number, a set of latitude and longitude coordinates, an elevation, a barometric pressure, a cellular tower triangulation location, a time of day, etc.).

Additionally, when the courier device enters into a wireless local area network (WLAN) generated by a delivery location device, associated with the delivery location, the courier device may be located within a particular distance from the delivery location device, and the delivery location device may detect the presence of the courier device. The delivery location device may generate delivery location information based on detecting the presence of the courier device. For example, an application, associated with the courier company and installed on the delivery location device, may detect the courier device, verify that the courier device has scanned the package, and may generate the delivery location information. The delivery location information may include information associated with the delivery location (e.g., a set of GPS coordinates, a street address, a building number, a floor number, a unit number, a room number, a set of latitude and longitude coordinates, an elevation, a barometric pressure, a cellular tower triangulation location, a time of day, etc.). The delivery location device may forward the delivery location information to the cloud device.

The cloud device may receive the courier location information and the delivery location information from the courier device and the delivery location device, respectively. The cloud device may then authenticate the courier device and the delivery location device based on authentication techniques (e.g., a password, a security login, key exchange, etc.). If the courier device and the delivery location device are authenticated, the cloud device may determine whether the courier location information matches the delivery location information.

As shown in FIG. 1B, if the cloud device determines that the courier location information matches the delivery location information (e.g., indicating that the courier device is at the delivery location based on a threshold distance, based on a matching customer name, etc.), then the cloud device may authenticate (e.g., based on authentication techniques) a customer device associated with the customer, and may provide a delivery notification to the customer device. In some implementations, the delivery notification may include information indicating that a package is waiting to be delivered at the delivery location and information requesting that the customer sign for the package and/or provide other instructions. The customer device may display the delivery notification to the customer, and the customer may sign for the package by providing credentials (e.g., a password, a security login, identification information, etc.) to the customer device, and/or may provide other instructions (e.g., an instruction to leave the package at a neighbor's house, an instruction to deliver the package tomorrow, etc.) via the customer device.

As further shown, the customer device may provide the customer signature and/or the other instructions to the cloud device, and the cloud device may provide the customer signature and/or the other instructions to the courier device (e.g., via the courier company device). The courier device may display the customer signature and/or the other instructions to the courier, and the courier may leave the package at the delivery location if the customer provided a signature, and/or may follow the other instructions (e.g., leaving the package at the neighbor's house). In this way, a customer may sign for a delivery to a delivery location, associated with the customer, from any geographic location, while providing for dual verification and/or confirmation that the package is at the delivery location and that the customer is willing to receive the package even though the customer is not physically located at the delivery location.

Figure 2:
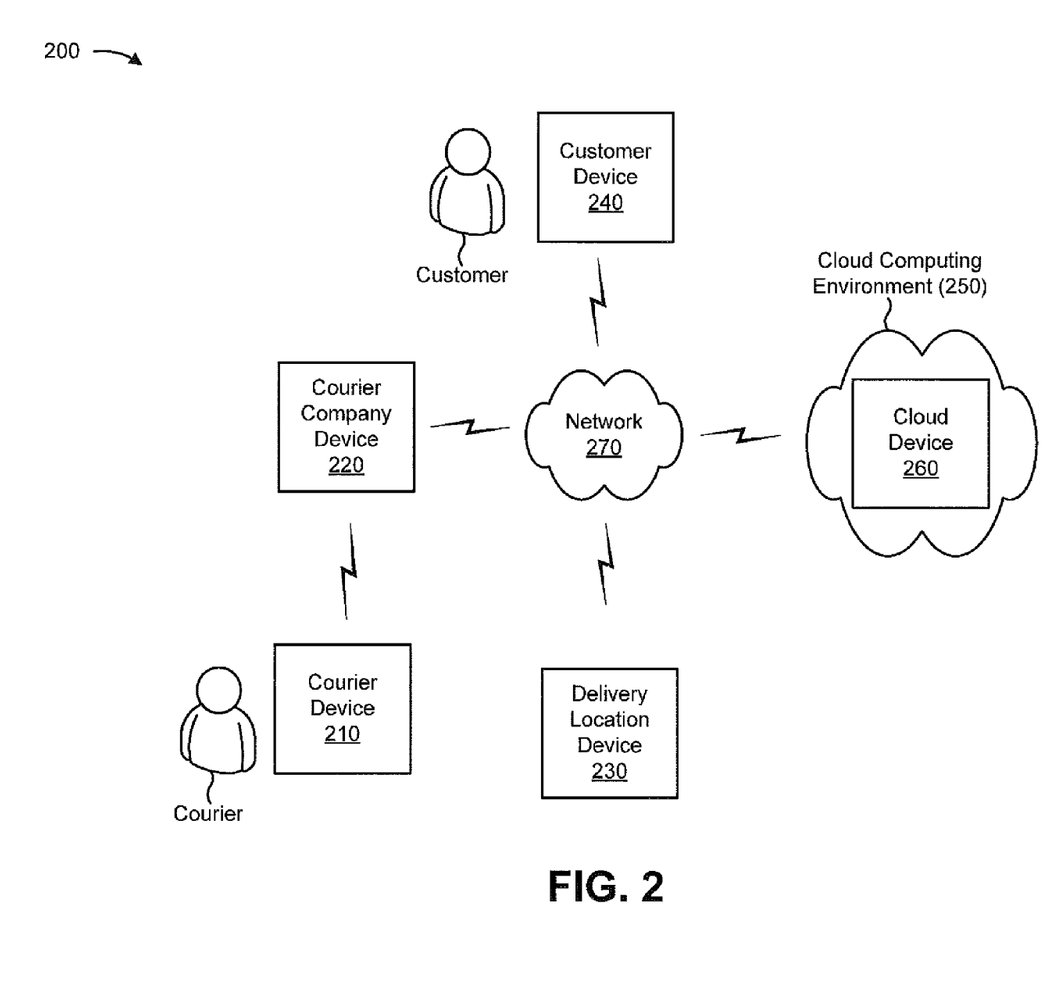
FIG. 2 is a diagram of an example environment in which systems and/or methods, described herein, may be implemented.

FIG. 2 is a diagram of an example environment 200 in which systems and/or methods described herein may be implemented. As shown in FIG. 2, environment 200 may include a courier device 210, a courier company device 220, a delivery location device 230, a customer device 240, a cloud computing environment 250, a cloud device 260, and a network 270.

Courier device 210 may include a device capable of receiving, generating, storing, processing, and/or providing information, such as information associated with a package that is to be delivered to a customer at a delivery location. For example, courier device 210 may include a computing device (e.g., a tablet computer, a handheld computer, etc.), a mobile phone (e.g., a smart phone, a radiotelephone, etc.), or a similar device. In some implementations, courier device 210 may receive information from and/or transmit information to courier company device 220 and/or delivery location device 230. In some implementations, courier device 210 may be associated with a courier and/or a courier company that employs the courier.

Courier company device 220 may include one or more devices capable of receiving, generating, storing, processing, and/or providing information, such as courier location information associated with courier device 210. For example, courier company device 220 may include a server device or a collection of server devices. In some implementations, courier company device 220 may be associated with a courier company (e.g., a company that provides a courier delivery service), and the courier may be employed by the courier company. In some implementations, courier company device 220 may be capable of receiving, storing, processing, and/or providing information associated with a customer signature of a customer that is to receive a package delivered by the courier.

Delivery location device 230 may include one or more devices capable of receiving, generating, storing, processing, and/or providing information, such as delivery location information associated with a delivery location. For example, delivery location device 230 may include a near field communication (NFC) device, a Bluetooth device, a wireless local area network (WLAN) (e.g., WiFi) device, a smart tag, and/or another transponder-based device. In some implementations, delivery location device 230 may be located at a delivery location (e.g., a customer home, a customer office, etc.) where the courier is to deliver one or more packages. In some implementations, delivery location device 230 may be associated with a WLAN and may detect the presence of one or more devices located within a particular distance from delivery location device 230, such as courier device 210.

Customer device 240 may include a device capable of receiving, generating, storing, processing, and/or providing information, such as information associated with a customer signature of a customer associated with a delivery location. For example, customer device 240 may include a computing device (e.g., a tablet computer, a handheld computer, a desktop computer, etc.), a mobile phone (e.g., a smart phone, a radiotelephone, etc.), or a similar device. In some implementations, customer device 240 may be associated with a customer that is associated with the delivery location (e.g., the customer home, the customer office, etc.). In some implementations, customer device 240 may be capable of receiving (e.g., via a touch screen, a keyboard, etc.) a customer signature and providing the customer signature.

Cloud computing environment 250 may include an environment that delivers computing as a service, whereby shared resources, services, etc. may be provided to devices, such as courier company device 220, delivery location device 230, and/or customer device 240. Cloud computing environment 250 may provide computation, software, data access, storage, etc. services that do not require end-user (e.g., customer device 240) knowledge of a physical location and configuration of system(s) and/or device(s) that deliver the services. In some implementations, cloud computing environment 250 may include one or more cloud devices 260. In some implementations, cloud computing environment 250 may be associated with a communication provider (e.g., an Internet service provider, a telecommunications service provider, a television service provider, etc.) of the customer.

Cloud device 260 may include one or more devices capable of receiving, generating, storing, processing, and/or providing information, such as courier location information, delivery location information, and/or information associated with a customer signature. For example, cloud device 260 may include a server device or a collection of server devices. In some implementations, cloud device 260 may be capable of receiving courier location information, receiving delivery location information, and comparing the courier location information and the delivery location information. Additionally, or alternatively, cloud device 260 may be capable of generating and providing a delivery notification associated with a package that is to be delivered to a delivery location associated with a customer.

Network 270 may include one or more wired and/or wireless networks that permit communication between devices included in environment 200. For example, network 270 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, a combination of these or other types of networks, and/or other further network types.

The number of devices and networks shown in FIG. 2 is provided for explanatory purposes. In practice, there may be additional devices and/or networks, fewer devices and/or networks, different devices and/or networks, or differently arranged devices and/or networks than those shown in FIG. 2. Furthermore, two or more of the devices shown in FIG. 2 may be implemented within a single device, or a single device shown in FIG. 2 may be implemented as multiple, distributed devices. Additionally, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
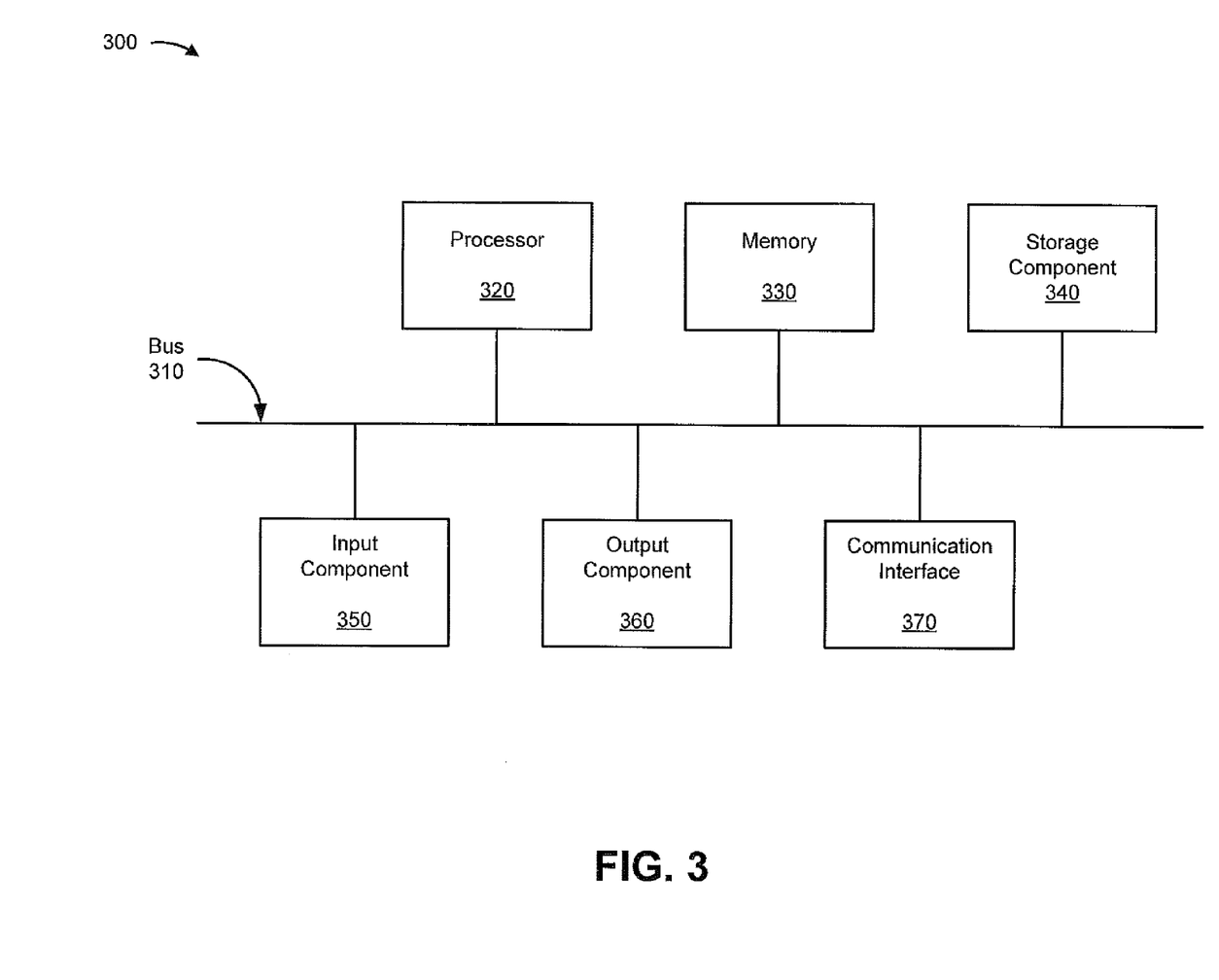
FIG. 3 is a diagram of example components of one or more devices of FIG. 2.

FIG. 3 is a diagram of example components of a device 300. Device 300 may correspond to courier device 210, courier company device 220, delivery location device 230, customer device 240, and/or cloud device 260. Additionally, or alternatively, each of courier device 210, courier company device 220, delivery location device 230, customer device 240, and/or cloud device 260 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a path that permits communication among the components of device 300. Processor 320 may include a processor, a microprocessor, and/or any processing component (e.g., a field-programmable gate array ("FPGA"), an application-specific integrated circuit ("ASIC"), etc.) that interprets and/or executes instructions. In some implementations, processor 320 may include one or more processor cores. Memory 330 may include a random access memory ("RAM"), a read only memory ("ROM"), and/or any type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include any component that permits a user to input information to device 300 (e.g., a touch screen display, a keyboard, a keypad, a mouse, a button, a switch, etc.). Output component 360 may include any component that outputs information from device 300 (e.g., a display, a speaker, one or more light-emitting diodes ("LEDs"), etc.).

Communication interface 370 may include any transceiver-like component, such as a transceiver and/or a separate receiver and transmitter, that enables device 300 to communicate with other devices and/or systems, such as via a wired connection, a wireless connection, or a combination of wired and wireless connections. For example, communication interface 360 may include a component for communicating with another device and/or system via a network. Additionally, or alternatively, communication interface 370 may include a logical component with input and output ports, input and output systems, and/or other input and output components that facilitate the transmission of data to and/or from another device, such as an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium is defined as a non-transitory memory device. A memory device includes memory space within a single physical storage device or memory space spread across multiple physical storage devices.

Software instructions may be read into memory 330 from another computer-readable medium or from another device via communication interface 370. When executed, software instructions stored in memory 330 may cause processor 320 to perform one or more processes that are described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3.

Figure 4:
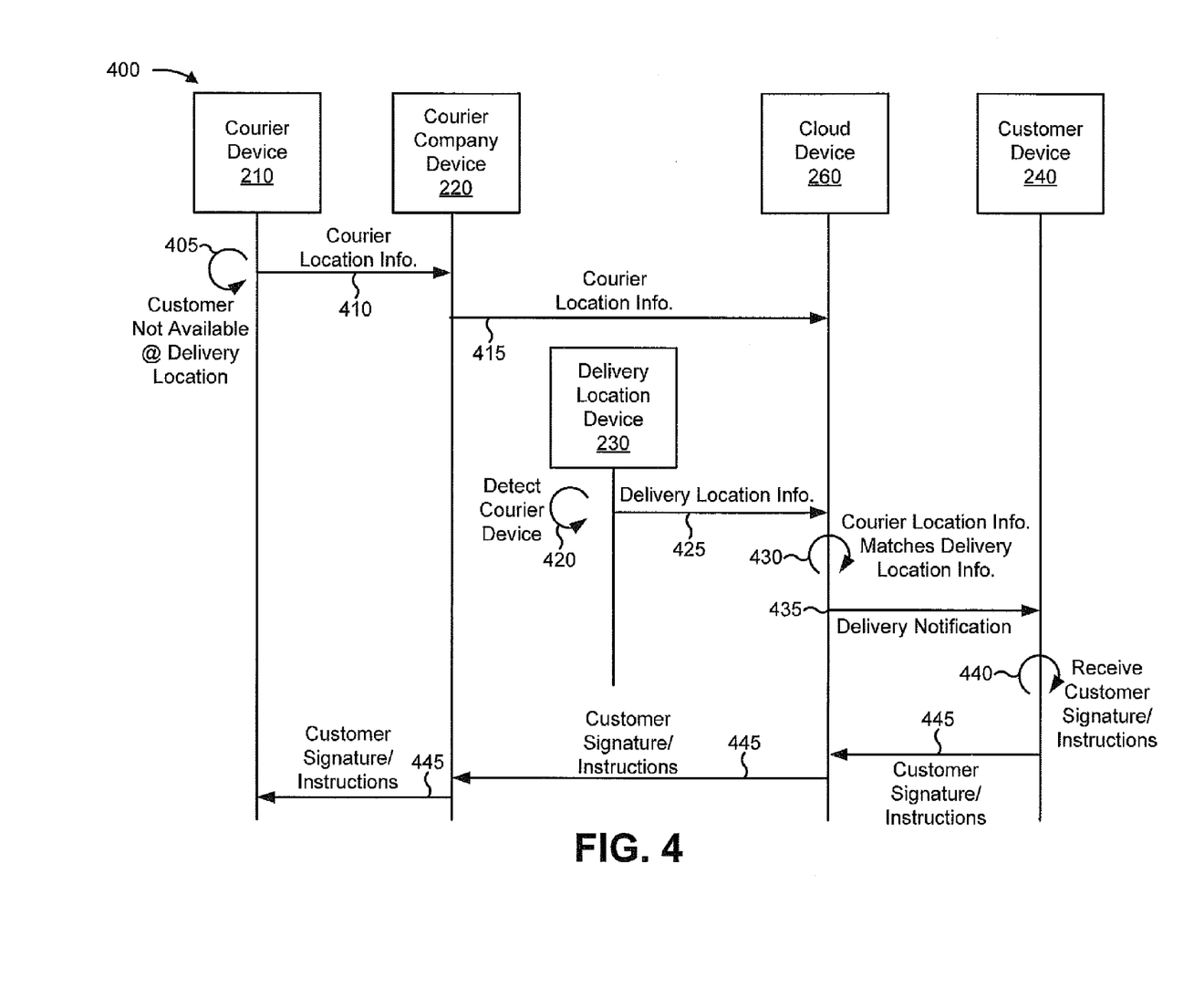
FIG. 4 is a call flow diagram of an example process for verifying that a package is to be delivered to a delivery location, associated with a customer, and receiving a customer signature from the customer when the customer is not available at the delivery location.

FIG. 4 is a call flow diagram of an example process 400 for verifying that a package is to be delivered to a delivery location, associated with a customer, and receiving a customer signature from the customer when the customer is not available at the delivery location. In some implementations, one or more call flow steps of FIG. 4 may be performed by one or more devices included in environment 200.

As shown in FIG. 4, process 400 may include determining that a customer, associated with a package being delivered by a courier, is not available at a delivery location to which the package is to be delivered (shown at reference number 405). For example, courier device 210 may determine that a customer, associated with a package being delivered by a courier, is not available at a delivery location to which the package is to be delivered.

In some implementations, courier device 210 may determine that the customer is not available at the delivery location based on input provided, to courier device 210, by a courier associated with courier device 210. For example, the courier may arrive at the delivery location, may determine that the customer is not available at the delivery location, and may provide (e.g., via a touch screen, a keyboard, etc.), to courier device 210, input indicating that the customer is not available at the delivery location.

As further shown in FIG. 4, process 400 may include determining and providing courier location information (shown at reference number 410). For example, courier device 210 may determine and provide courier location information associated with courier device 210. In some implementations, courier device 210 may determine and provide the courier location information when courier device 210 determines that the customer is not available at the delivery location (e.g., after courier device 210 determines that the customer is not available at the delivery location). Additionally, or alternatively, courier device 210 may determine and provide the courier location information when courier device 210 receives information (e.g., user input), indicating that courier device 210 is to determine and provide the courier location information, from the courier.

Courier location information may include information associated with an attempt to deliver a package to a delivery location associated with a customer. For example, the courier location information may include information indicating that courier device 210 is located at the delivery location (e.g., a set of GPS coordinates, a street address, a set of latitude and longitude coordinates, etc. that matches, or is within a particular distance from, the delivery location), information that identifies the customer that is to receive the package (e.g., a customer name, a customer identification number, etc.), or other information associated with the attempted delivery.

In some implementations, courier device 210 may determine the courier location information based on a capability of courier device 210. For example, courier device 210 may determine information (e.g., a set of GPS coordinates, a set of a longitude and latitude coordinates, etc.) that identifies a geographic location of courier device 210. Additionally, or alternatively, courier device 210 may determine the courier location information based on information stored by courier device 210. For example, courier device 210 may store information associated with a delivery (e.g., a customer name, a customer identification number, package tracking information associated with the package, etc.) and courier device 210 may determine the courier location information based on the stored information. Additionally, or alternatively, courier device 210 may determine the courier location information based on information provided by the courier. For example, the courier may provide (e.g., via a touch screen, a keyboard, etc.) information associated with the location of courier device 210 (e.g., a street address, an apartment number, etc.), and courier device 210 may determine the courier location information based on the information provided by the courier.

In some implementations, courier device 210 may determine the courier location information and may provide the courier location information to another device. For example, courier device 210 may determine the courier location information and may provide the courier location information to courier company device 220.

As further shown in FIG. 4, process 400 may include forwarding the courier location information (shown at reference number 415). For example, courier company device 220 may forward the courier location information. In some implementations, courier company device 220 may forward the courier location information when courier company device 220 receives the courier location information from courier device 210 (e.g., after courier device 210 provides the courier location information).

In some implementations, courier company device 220 may forward the courier location information to cloud device 260. In some implementations, courier company device 220 may forward the courier location information to cloud device 260 to allow cloud device 260 to authenticate courier device 210 and/or compare the courier location information to delivery location information provided by delivery location device 230, as discussed below. In some implementations, cloud device 260 may authenticate (e.g., using known authentication techniques, such as a password, a security login, key exchange, etc.) courier device 210 or courier company device 220 when cloud device 260 receives the courier location information provided by courier device 210.

As further shown in FIG. 4, process 400 may include detecting that the courier device is located at or near the delivery location (shown at reference number 420). For example, delivery location device 230 may determine that courier device 210 is located at the delivery location. In some implementations, delivery location device 230 may determine that courier device 210 is located near the delivery location when the courier arrives at the delivery location while carrying courier device 210 (e.g., after the courier arrives at the delivery location).

In some implementations, delivery location device 230 may determine that courier device 210 is at the delivery location based on information associated with courier device 210. For example, the courier (e.g., while carrying courier device 210) may arrive at the delivery location, delivery location device 230 may detect (e.g., via a NFC device, a Bluetooth device, a WLAN device, a smart tag, and/or another transponder-based device of delivery location device 230) that courier device 210 is at the delivery location, and delivery location device 230 may determine that courier device 210 is located at the delivery location based on detecting courier device 210 within the range of delivery location device 230.

As further shown in FIG. 4, process 400 may include determining and providing delivery location information associated with the delivery location (shown at reference number 425). For example, delivery location device 230 may determine and provide delivery location information associated with the delivery location. In some implementations, delivery location device 230 may determine and provide the delivery location information when delivery location device 230 determines that courier device 210 is located at or near the delivery location (e.g., after delivery location device 230 detects courier device 210).

Delivery location information may include information associated with a delivery location associated with a customer. For example, the delivery location information may include information identifying the delivery location (e.g., GPS coordinates, a street address, latitude and longitude coordinates, etc. of the delivery location), information that identifies the customer associated with the delivery location (e.g., a customer name, a customer identification number, etc.), and/or other information.

In some implementations, delivery location device 230 may determine the delivery location information based on a capability of delivery location device 230. For example, delivery location device 230 may determine information (e.g., a set of GPS coordinates, a set of longitude and latitude coordinates, etc.) that identifies a geographic location of delivery location device 230. Additionally, or alternatively, delivery location device 230 may determine the delivery location information based on information stored by delivery location device 230. For example, delivery location device 230 may store information that identifies a customer associated with the delivery location (e.g., a customer name, a customer identification number, a street address associated with delivery location device 230, etc.) and delivery location device 230 may determine the delivery location information based on the stored information. As another example, delivery location device 230 may be a stationary device (e.g., a wireless router), and delivery location device 230 may store (e.g., in a memory location of delivery location device 230) information that the geographic location of delivery location device 230. In this example, delivery location device 230 may determine the delivery location information based on the stored information that identifies the geographic location.

In some implementations, delivery location device 230 may determine the delivery location information and may provide the delivery location information to another device. For example, delivery location device 230 may determine the delivery location information and may provide the delivery location information to cloud device 260 to allow cloud device 260 to authenticate delivery location device 230 and/or compare the delivery location information to the courier location information provided by courier device 210, as discussed above. In some implementations, cloud device 260 may authenticate (e.g., using known authentication techniques, such as a password, a security login, key exchange, etc.) delivery location device 230 when cloud device 260 receives the delivery location information provided by delivery location device 230.

As further shown in FIG. 4, process 400 may include determining that the courier location information matches the delivery location information (shown at reference number 430). For example, cloud device 260 may determine that the courier location information, provided by courier device 210, matches the delivery location information provided by delivery location device 230. In some implementations, cloud device 260 may determine that the courier location information matches the delivery location information when cloud device 260 receives the courier location information and the delivery location information (e.g., after cloud device 260 receives the courier location information and the delivery location information).

In some implementations, cloud device 260 may determine whether the courier location information matches the delivery location information based on comparing the courier location information and the delivery location information. For example, cloud device 260 may receive courier location information that includes a first set of GPS coordinates (e.g., determined by courier device 210), and may receive delivery location information that includes a second set of GPS coordinates (e.g., determined by delivery location device 230). In this example, cloud device 260 may compare the first set of GPS coordinates and the second set of GPS coordinates, and may determine that the first set of GPS coordinates matches the second set of GPS coordinates (e.g., within a threshold distance, such as 40 feet, 10 yards, 0.0002 degrees longitude, 0.0001 degrees latitude, etc.).

As another example, cloud device 260 may compare a first customer name, included in the courier location information, to a second customer name, included in the delivery location information. In this example, if the first customer name matches the second customer name, then cloud device 260 may determine that courier location information matches the delivery location information.

In some implementations, cloud device 260 may determine that multiple portions (e.g., a GPS location, a customer name, a street address, etc.) of the courier location information match corresponding multiple portions of the delivery location information to identify a match between the courier location information and the delivery location information.

In some implementations, cloud device 260 may determine that the courier delivery information does not match the delivery location information (e.g., when the difference between the first set of GPS coordinates and the second set of GPS coordinates does not satisfy the threshold distance, when the first customer name does not match the second customer name, etc.), and cloud device 260 may provide (e.g., to courier company device 220, to courier device 210, etc.) an indication associated with determining that the courier location information does not match the delivery location information (e.g., an indication that a customer signature cannot be remotely obtained, an indication the courier may be at a wrong delivery location, etc.).

As further shown in FIG. 4, process 400 may include generating and providing a delivery notification (shown at reference number 435). For example, cloud device 260 may generate and provide a delivery notification to customer device 240. In some implementations, cloud device 260 may generate and provide the delivery notification when cloud device 260 determines that the courier location information matches the delivery location information (e.g., after cloud device 260 determines that the courier location information matches the delivery location information). In some implementations, cloud device 260 may identify and authenticate customer device 240, associated with the customer, before cloud device 260 generates and/or provides the delivery notification. For example, cloud device 260 may store information indicating that the customer is associated with customer device 240, may authenticate (e.g., using known authentication techniques, such as a password, a security login, key exchange, etc.) customer device 240, and may generate and provide the delivery notification after identifying and authenticating customer device 240 associated with the customer.

In some implementations, the delivery notification may include information indicating that the courier is available at the delivery location associated with the customer. Additionally, or alternatively, the delivery notification may include information that identifies the delivery location (e.g., a street address, etc.), a time associated with the delivery, a date associated with the delivery, information associated with the package to be delivered (e.g., package tracking information, etc.), information that identifies the courier company, and/or other information associated with the delivery.

In some implementations, cloud device 260 may generate the delivery notification based on information included in the courier location information and/or the delivery location information. In some implementations, cloud device 260 may provide the delivery notification to customer device 240 associated with the customer. In some implementations, the delivery notification may be delivered to customer device 240 in an electronic mail (e-mail) message, a text message (e.g., a short message service message, a multimedia message, etc.), a voice message (e.g., a voice call, a voicemail, etc.) or in another manner. Additionally, or alternatively, the delivery notification may be delivered in multiple manners (e.g., the delivery notification may be delivered in an email message and a text message, a voice message and an email message, etc.).

As further shown in FIG. 4, process 400 may include receiving the delivery notification and determining a customer signature and/or other instructions associated with the customer (shown at reference number 440). For example, customer device 240 may receive the delivery notification provided by cloud device 260, and customer device 240 may determine a customer signature and/or other instructions associated with the customer. In some implementations, customer device 240 may receive the delivery notification and determine the customer signature and/or the other instructions when cloud device 260 provides the delivery notification (e.g., after cloud device 260) provides the delivery notification.

In some implementations, customer device 240 may receive the delivery notification and may display information associated with the delivery notification. For example, customer device 240 may receive the delivery notification, and may display (e.g., via a display screen of customer device 240) information included in the delivery notification (e.g., information that identifies the delivery location, the time associated with the delivery, the date associated with the delivery, the information associated with the package to be delivered, information that identifies the courier company, etc.).

Additionally, or alternatively, customer device 240 may receive the delivery notification and may determine a customer signature associated with the customer. For example, customer device 240 may receive the delivery notification, may display a user interface that allows the customer to provide, via a touch screen, input associated with a handwritten customer signature, and customer device 240 may determine the customer signature based on the input associated with the handwritten customer signature. As another example, customer device 240 may display a user interface that allows the customer to provide, via a keyboard, user input associated with an electronic customer signature, and customer device 240 may determine the customer signature based on the input associated with the electronic customer signature. As another example, the customer may provide, to customer device 240, a customer signature in the form of credentials (e.g., a password, a security login, identification information, etc.) associated with the customer. As another example, the customer may provide, to customer device 240, a customer signature in the form of a voice message (e.g., verbal permission, provided to customer device 240, for the courier to leave the package at the delivery location, etc.).

In some implementations, customer device 240 may also determine other instructions associated with the delivery. For example, customer device 240 may receive the delivery notification and may provide, for display, a user interface including one or more input elements (e.g., a text box, a check box, a drop down menu, etc.) that allow the customer to specify other instructions associated with delivering the package (e.g., instructions associated with retrying delivery at a later time, instructions associated with leaving the package in a specific area, etc.).

As further shown in FIG. 4, process 400 may include providing the customer signature and/or the other instructions (shown at reference number 445). For example, customer device 240 may provide the customer signature and/or the other instructions to cloud device 260. Cloud device 260 may receive the customer signature and/or the other instructions and may provide the customer signature and/or the other instructions to courier company device 220. Similarly, courier company device 220 may receive the customer signature and/or the other instructions and may provide the customer signature and/or other instructions to courier device 210. In some implementations, customer device 240 may not directly provide the customer signature and/or the other instructions to courier device 210 (e.g., there is no direct interaction between customer device 240 and courier device 210).

In some implementations, courier device 210 may receive (e.g., via cloud device 260) the customer signature and/or the other instructions, and courier device 210 may display (e.g., via a display screen of courier device 210) the customer signature and/or the other instructions. The courier may view the customer signature and/or the other instructions, and may act accordingly (e.g., by leaving the package, by leaving the package in the specific area identified in the other instructions, etc.).

Although FIG. 4 shows example steps of process 400, in some implementations, process 400 may include additional steps, different steps, fewer steps, or differently arranged steps than those depicted in FIG. 4. Additionally, or alternatively, one or more of the steps of process 400 may be performed in parallel.

Figure 5:
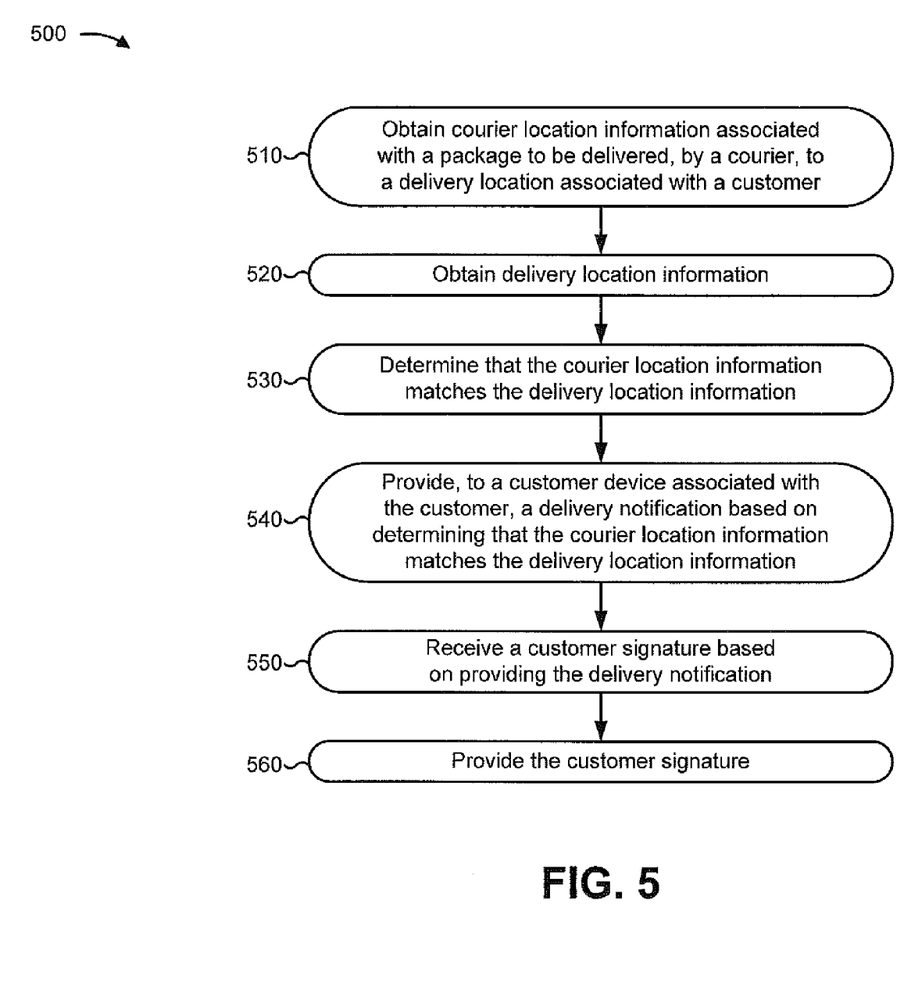
FIG. 5 is a flow chart of an example process for determining that courier location information matches delivery location information, providing a delivery notification, and receiving and providing a customer signature.

FIG. 5 is a flow chart of an example process 500 for determining that courier location information matches delivery location information, providing a delivery notification, and receiving and providing a customer signature. In some implementations, one or more process blocks of FIG. 5 may be performed by cloud device 260. In some implementations, one or more process blocks of FIG. 5 may be performed by another device or a group of devices separate from or including cloud device 260, such as another device included in environment 200.

As shown in FIG. 5, process 500 may include obtaining courier location information associated with a package to be delivered, by a courier, to a delivery location associated with a customer (block 510). For example, cloud device 260 may obtain courier location information associated with a package to be delivered to a delivery location associated with a customer. In some implementations, cloud device 260 may obtain the courier location information when courier device 210 determines that the customer is not available at the delivery location. For example, courier device 210 may determine that the customer is not available at the delivery location (e.g., as discussed above with regard to reference 405), courier device 210 may provide the courier location information to courier company device 220 (e.g., as discussed above with regard to reference 410), and courier company device 220 may forward the courier location information to cloud device 260 (e.g., as discussed above with regard to reference 415). In this example, cloud device 260 may obtain the courier location information based on receiving the courier location information forwarded by courier company device 220. In some implementations, cloud device 260 may receive the courier location information directly from courier device 210 (e.g., without being forwarded via courier company device 220).

As further shown in FIG. 5, process 500 may include obtaining delivery location information (block 520). For example, cloud device 260 may obtain delivery location information. In some implementations, cloud device 260 may obtain the delivery location information when delivery location device 230 detects that courier device 210 is at or near the delivery location. For example, delivery location device 230 may detect that courier device 210 is at or near the delivery location (e.g., as discussed above with regard to reference 420) and delivery location device 230 may provide the delivery location information to cloud device 260 (e.g., as discussed above with regard to reference 425). In this example, cloud device 260 may obtain the delivery location information based on receiving the delivery location information provided by delivery location device 230.

As further shown in FIG. 5, process 500 may include determining that the courier location information matches the delivery location information (block 530). For example, cloud device 260 may determine that the courier location information matches the delivery location information, as discussed above with regard to reference 430. In some implementations, cloud device 260 may determine that the courier location information matches the delivery location information to verify that the courier is at the delivery location.

As further shown in FIG. 5, process 500 may include providing, to a customer device associated with the customer, a delivery notification based on determining that the courier location information matches the delivery location information (block 540). For example, cloud device 260 may provide, to customer device 240 associated with the customer, a delivery notification based on determining that the courier location information matches the delivery location information, as discussed above with regard to reference 435.

As further shown in FIG. 5, process 500 may include receiving a customer signature based on providing the delivery notification (block 550). For example, cloud device 260 may receive a customer signature based on providing the delivery notification. In some implementations, courier device 260 may receive the customer signature based on information received from customer device 240. For example, customer device 240 may receive the delivery notification provided by cloud device 260, may display (e.g., to the customer) information included in the delivery notification, and the customer may provide, to customer device 240, a custom signature (e.g., as discussed above with regard to reference 440). In this example, customer device 240 may receive the customer signature, may provide the customer signature to cloud device 260 (e.g., as discussed above with regard to reference 445), and cloud device 260 may receive the customer signature provided by customer device 240.

As further shown in FIG. 5, process 500 may include providing the customer signature (block 560). For example, cloud device 260 may provide the customer signature. In some implementations, cloud device 260 may provide the customer signature to courier company device 220 and/or courier device 210, as discussed above with regard to reference 445.

Although FIG. 5 shows example blocks of process 500, in some implementations, process 500 may include additional blocks, different blocks, fewer blocks, or differently arranged blocks than those depicted in FIG. 5. Additionally, or alternatively, one or more of the blocks of process 500 may be performed in parallel.

Figure 6A:
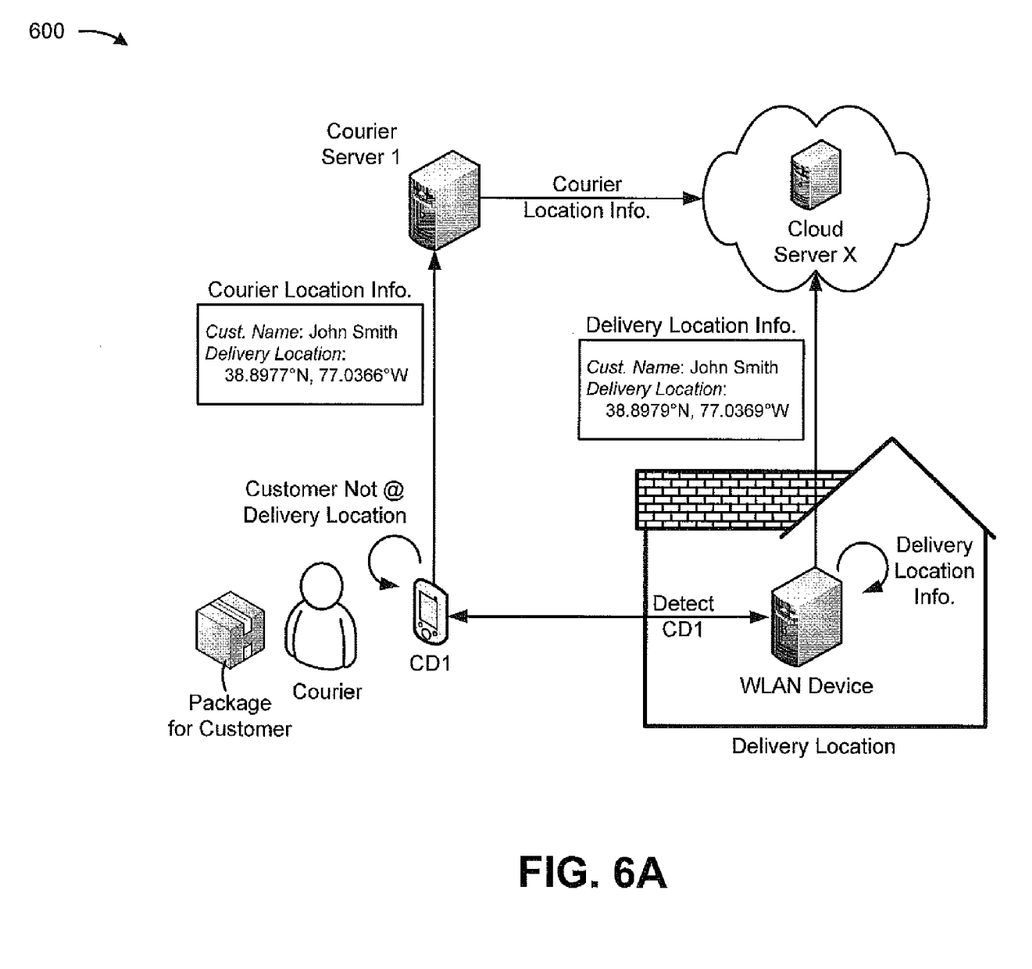
FIGS. 6A-6C are diagrams of an example implementation relating to the example processes shown in FIG. 4 and FIG. 5.
Figure 6B:
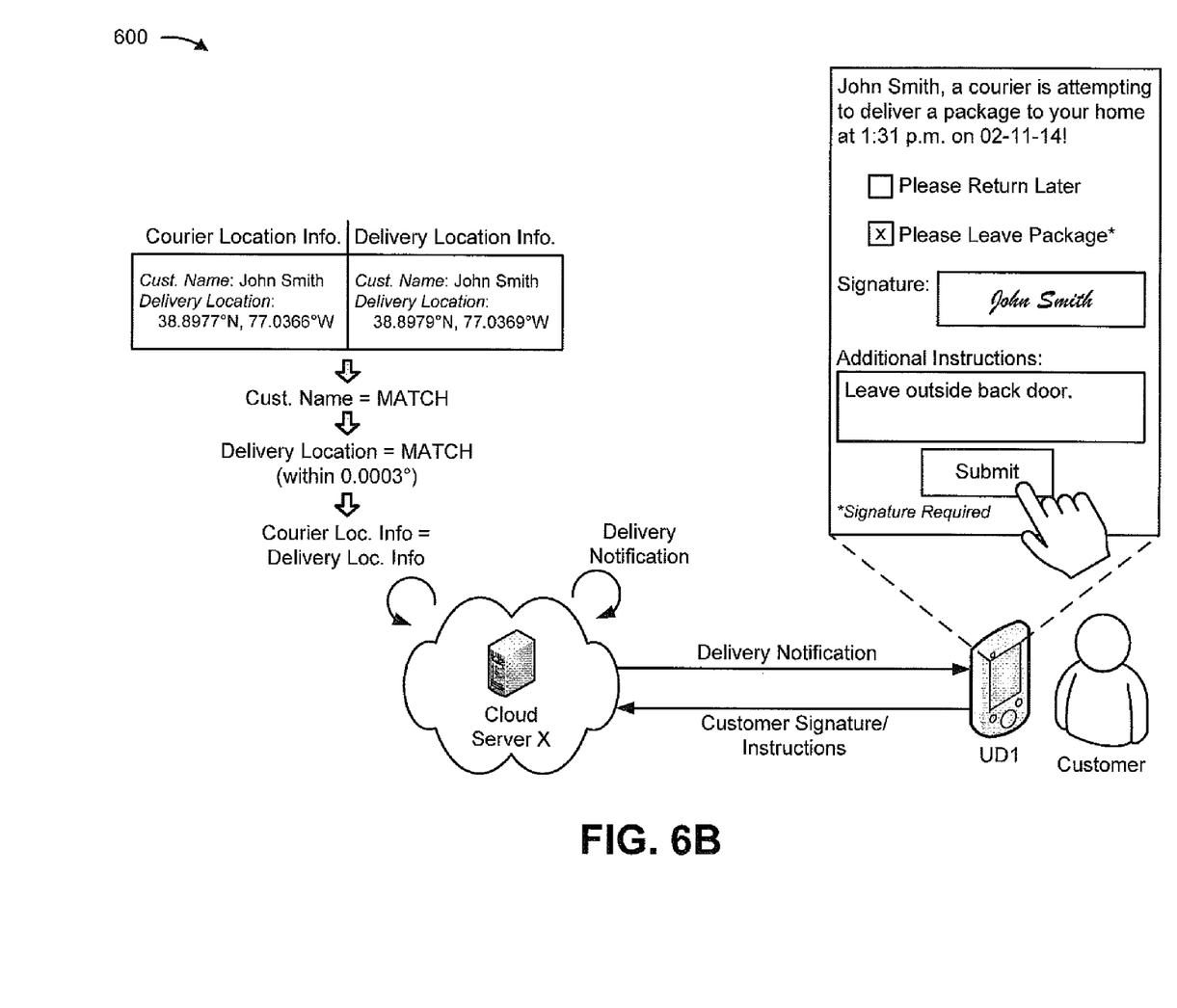
Figure 6C:
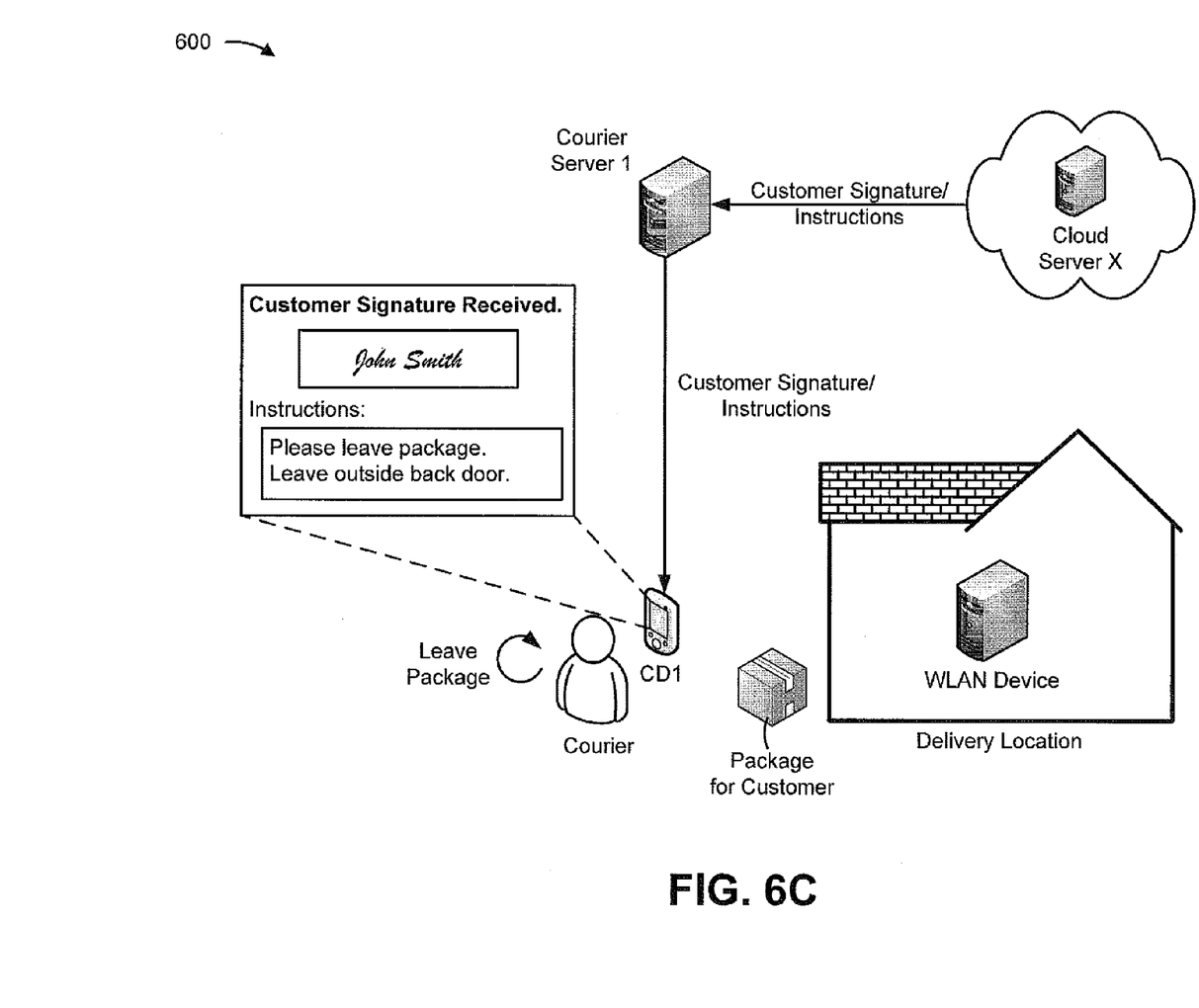

FIGS. 6A-6C are diagrams of an example implementation 600 relating to example processes 400 and 500 shown in FIG. 4 and FIG. 5, respectively. For the purposes of example implementation 600, assume that a courier, associated with a courier company, arrives at a delivery location, associated with a customer, to deliver a package to the customer. Further, assume that the customer is not physically present at the delivery location. Finally, assume that the courier carries a courier device, CD1, and that the courier is to obtain a customer signature, associated with the customer, in order to leave the package at the delivery location.

As shown in FIG. 6A, the courier may determine that the customer is not available at the delivery location, and may provide, to CD1, information indicating that the customer is not available. As shown, CD1 may determine that the customer is not available based on the information provided by the courier. As further shown, CD1 may determine courier location information based on determining that the customer is not available at the delivery location. As shown, the courier location information may include information identifying the customer (e.g., Customer Name: John Smith) and information identifying a geographic location of CD1 determined by CD1 (e.g., Location: 38.8977° N, 77.0366° W). As further shown, CD1 may provide the courier location information to a courier company device associated with CD1, identified as courier server 1, and courier server 1 may provide the courier location information to a cloud device identified as cloud server X.

As further shown in FIG. 6A, a device, associated with the customer and located at the delivery location (e.g., WLAN device), may detect CD1 when CD1 arrives within a particular distance of the delivery location. As further shown, the WLAN device may determine delivery location information associated with the delivery location. As shown, the delivery location information may include information identifying the customer associated with the WLAN device (e.g., Customer Name: John Smith) and information identifying a geographic location of the WLAN device determined by the WLAN device (e.g., Location: 38.8979° N, 77.0369° W). As further shown, the WLAN device may provide the delivery location information to cloud server X.

As shown in FIG. 6B, cloud server X may receive the courier location information (e.g., provided by CD1) and the delivery location information (e.g., provided by the WLAN device), and may determine that the courier location information matches the delivery location information. As shown, cloud server X may determine that the courier location information and the delivery location information both include information that identifies John Smith as the customer, and both include information identifying the same geographic location within a threshold distance of 0.0003° latitude and 0.0003° longitude.

As further shown, cloud server X may generate a delivery notification based on determining that the courier location information matches the delivery location information, and cloud server X may provide the delivery notification to a customer device associated with the customer, UD1. As further shown, UD1 may receive the delivery notification and may display a user interface associated with the delivery notification. As shown, the user interface may include information, included in the delivery notification, associated with the delivery attempt (e.g., "John Smith, a courier is attempting to deliver a package to your home at 1:31 p.m. on Feb. 11, 2014!). As shown, the customer may provide (e.g., via a radio button included in the user interface) input associated with an instruction to leave the package at the delivery location (e.g., "Please leave package"). As further shown, the customer may also provide (e.g., via a first text box included in the user interface) input associated with a customer signature, may provide (e.g., via a second text box included in the user interface) input associated with another instruction, and may provide (e.g., by selecting a Submit button included in the user interface) input indicating that the customer has finished providing the customer signature and the instructions. As further shown, UD1 may provide the customer signature and the instructions to cloud server X.

As shown in FIG. 6C, cloud server X may receive the customer signature and the instructions, and cloud server X may provide the customer signature and the instructions to CD1. As further shown, CD1 may display (e.g., to the courier) information indicating that the customer signature has been received (e.g., "Customer signature received"), may display the customer signature, and may display the instructions. The courier may leave the package at the delivery location based on the delivery instruction (e.g., since the customer signature has been received).

As indicated above, FIGS. 6A-6C are provided merely as an example. Other examples are possible and may differ from what was described with regard to FIGS. 6A-6C.

Implementations described herein may allow a customer to sign for a delivery (e.g., of a package from a courier company) to a delivery location, associated with the customer, from any geographic location. Implementations described herein may also provide dual verification and/or confirmation that the package is at the delivery location and that the customer is willing to receive the package even though the customer is not available at the delivery location.

The foregoing disclosure provides illustration and description, but is not intended to be exhaustive or to limit the implementations to the precise form disclosed. Modifications and variations are possible in light of the above disclosure or may be acquired from practice of the implementations. For example, the processes and/or methods described herein may be implemented in another manner, such as to confirm that a courier has picked up a package from a particular location associated with a customer, and providing, to the customer and via a customer device associated with the customer, a notification that the package was picked up.

As used herein, the term component is intended to be broadly construed as hardware, firmware, or a combination of hardware and software.

Some implementations are described herein in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "satisfying" a threshold (or similar terms) may be used interchangeably with "being greater than a threshold," "being greater than or equal to a threshold," "being less than a threshold," "being less than or equal to a threshold," or other similar terms.

Certain user interfaces have been described herein. In some implementations, the user interfaces may be customizable by a device or a user. Additionally, or alternatively, the user interfaces may be pre-configured to a standard configuration, a specific configuration based on a type of device on which the user interfaces are displayed, or a set of configurations based on capabilities and/or specifications associated with a device on which the user interfaces are displayed.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, as described herein, may be implemented in many different forms of software, firmware, and hardware in the implementations shown in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A system, comprising:
   one or more devices to:
     obtain, from a courier device associated with a courier, courier location information associated with a package to be delivered to a delivery location by the courier,
       the delivery location being associated with a customer, and
       the courier location information indicating that the customer is not available at the delivery location;
     obtain, from a delivery location device, delivery location information associated with the delivery location based on the delivery location device detecting the courier device,
       the delivery location device being associated with the customer and located at the delivery location,
       an application associated with the courier being installed on the delivery location device,
         the application detecting the courier device when the courier device is within a particular distance, and
         the delivery location information being generated after the application detects the courier device,
       the delivery location device being located at a fixed location prior to delivery, and
       the delivery location device comprising a wireless transceiver;
     compare the courier location information and the delivery location information;
     determine, based on comparing, that the courier location information matches the delivery location information;
     authenticate a customer device associated with the customer;
     provide, to the customer device, a delivery notification after authenticating the customer device and based on determining that the courier location information matches the delivery location information;
     receive, from the customer device over a network, a customer signature based on providing the delivery notification,
       the customer signature being associated with the customer; and
   provide the customer signature to inform the courier to deliver the package while the customer is not available at the delivery location.

2. The system of claim 1, where the courier location information is detected by the courier device.

3. The system of claim 1,
   where the courier location information includes information that identifies a first geographic location;
   where the delivery location information includes information that identifies a second geographic location;

where the one or more devices, when comparing the courier location information and the delivery location information, are to:
  compare the information that identifies the first geographic location and the information that identifies the second geographic location; and
where the one or more devices, when determining that the courier location information matches the delivery location information, are to:
  determine that the courier location information matches the delivery location information based on comparing the information that identifies the first geographic location and the information that identifies the second geographic location.

4. The system of claim 1, where the one or more devices are further to:
  determine a threshold distance associated with determining whether the courier location information matches the delivery location information;
  where the one or more devices, when comparing the courier location information and the delivery location information, are to:
    determine that the threshold distance is satisfied based on comparing the courier location information and the delivery location information; and
  where the one or more devices, when determining that the courier location information matches the delivery location information, are to:
    determine that the courier location information matches the delivery location information based on determining that the threshold distance is satisfied.

5. The system of claim 1, where the one or more devices are further to:
  generate the delivery notification based on determining that the courier location information matches the delivery location information; and
  where the one or more devices, when providing the delivery notification, are to:
    provide the generated delivery notification.

6. The system of claim 1,
  where the one or more devices, when receiving the customer signature, are to:
    receive information that identifies an instruction associated with delivering the package; and
  where the one or more devices, when providing the customer signature, are to:
    provide the information that identifies the instruction along with the customer signature.

7. A non-transitory computer-readable medium storing instructions, the instructions comprising:
  one or more instructions that, when executed by one or more processors, cause the one or more processors to:
    obtain, from a courier device associated with a courier, courier location information associated with a package to be delivered to a delivery location by the courier,
      the delivery location being associated with a customer, and
      the courier location information indicating that the customer is unavailable at the delivery location;
    obtain, from a delivery location device, delivery location information associated with the delivery location based on the delivery location device detecting the courier device,
      the delivery location device being associated with the customer and located at the delivery location,
      an application associated with the courier being installed on the delivery location device,
        the application detecting the courier device when the courier device is within a particular distance, and
        the delivery location information being generated after the application detects the courier device,
      the delivery location device being located at a fixed location prior to the delivery, and
      the delivery location device comprising a wireless transceiver;
    compare the courier location information and the delivery location information;
    determine, based on comparing, that the courier location information matches to the delivery location information;
    authenticate a customer device associated with the customer;
    provide, after authenticating the customer device, a delivery notification, associated with the package, based on determining that the courier location information matches the delivery location information,
      the delivery notification being provided to the customer device;
    obtain, from the customer device over a network, a customer signature, associated with the customer, based on providing the delivery notification; and
    provide the customer signature to instruct the courier to deliver the package while the customer is not available at the delivery location.

8. The non-transitory computer-readable medium of claim 7, where the courier location information is detected by the courier device.

9. The non-transitory computer-readable medium of claim 7,
  where the courier location information identifies a first geographic location;
  where the delivery location information identifies a second geographic location;
  where the one or more instructions, that cause the one or more processors to compare the courier location information and the delivery location information, cause the one or more processors to:
    compare the first geographic location and the second geographic location; and
  where the one or more instructions, that cause the one or more processors to determine that the courier location information matches the delivery location information, cause the one or more processors to:
    determine that the courier location information matches the delivery location information based on comparing the first geographic location and the second geographic location.

10. The non-transitory computer-readable medium of claim 7, where the one or more instructions, when executed by the one or more processors, further cause the one or more processors to:
  determine a threshold associated with determining whether the courier location information matches the delivery location information;
  where the one or more instructions, that cause the one or more processors to compare the courier location information and the delivery location information, cause the one or more processors to:
    determine that the threshold is satisfied based on comparing the courier location information and the delivery location information; and where the one or more instructions, that cause the one or more processors to determine that the courier location information matches the delivery location information, cause the one or more processors to:
   determine that the courier location information matches the delivery location information based on determining that the threshold is satisfied.

11. The non-transitory computer-readable medium of claim 7, where the one or more instructions, when executed by the one or more processors, further cause the one or more processors to:
   generate the delivery notification based on determining that the courier location information matches the delivery location information; and
   where the one or more instructions, that cause the one or more processors to provide the delivery notification, cause the one or more processors to:
      provide the generated delivery notification.

12. The non-transitory computer-readable medium of claim 7,
   where the one or more instructions, that cause the one or more processors to receive the customer signature, cause the one or more processors to:
      receive information that identifies an instruction associated with delivering the package; and
   where the one or more instructions, that cause the one or more processors to provide the customer signature, further cause the one or more processors to:
      provide the information that identifies the instruction along with the customer signature.

13. A method, comprising:
   obtaining, by one or more devices and from a courier device associated with a courier, courier location information associated with a package to be delivered to a delivery location by the courier,
      the delivery location being associated with a customer, and
      the courier location information identifying a first geographic location associated with the courier device;
   obtaining, by the one or more devices and from a delivery location device, delivery location information identifying a second geographic location as the delivery location based on the delivery location device detecting the courier device,
      the delivery location device being associated with the customer and located at the delivery location,
      an application associated with the courier being installed on the delivery location device,
         the application detecting the courier device when the courier device is within a particular distance, and
         the delivery location information being generated after the application detects the courier device,
      the delivery location device being located at a fixed location prior to the delivery, and
      the delivery location device comprising a wireless transceiver;
   comparing, by the one or more devices, the courier location information and the delivery location information based on comparing the first geographic location and the second geographic location;
   determining, by the one or more devices and based on comparing, that the courier location information matches the delivery location information;
   authenticating, by the one or more devices, a customer device associated with the customer;
   providing, by the one or more devices after authenticating the customer device, a delivery notification based on determining that the courier location information matches the delivery location information,
      the delivery notification being provided to the customer device;
   obtaining, by the one or more devices and from the customer device over a network, a customer signature, associated with the package, based on providing the delivery notification,
      the customer signature being associated with the customer; and
   providing, by the one or more devices, the customer signature, to inform the courier to deliver the package.

14. The method of claim 13, where the courier location information is detected by the courier device.

15. The method of claim 13, where determining that the courier location information matches the delivery location information further comprises:
   determining that the courier location information matches the delivery location information based on the first geographic location being within a particular distance of the second geographic location.

16. The method of claim 13, further comprising:
   determining a threshold distance associated with determining whether the courier location information matches the delivery location information;
   where comparing the courier location information and the delivery location information comprises:
      determining that the threshold distance is satisfied based on comparing the courier location information and the delivery location information; and
   where determining that the courier location information matches the delivery location information comprises:
      determining that the courier location information matches the delivery location information based on determining that the threshold distance is satisfied.

17. The method of claim 13,
   where obtaining the customer signature comprises:
      obtaining information that identifies an instruction associated with delivering the package; and
   where providing the customer signature comprises:
      providing the information that identifies the instruction along with the customer signature.

18. The system of claim 1, where the one or more devices, when obtaining the delivery location information associated with the delivery location, are to:
   obtain the delivery location information associated with the delivery location based on the wireless transceiver of the delivery location device detecting the courier device at the delivery location.

19. The non-transitory computer-readable medium of claim 7, where the one or more instructions, that cause the one or more processors to obtain the delivery location information associated with the delivery location, cause the one or more processors to:
   obtain the delivery location information associated with the delivery location based on the wireless transceiver of the delivery location device detecting the courier device at the delivery location.

20. The method of claim 13, where obtaining the delivery location information identifying the second geographic location as the delivery location includes:
   obtaining the delivery location information identifying the second geographic location as the delivery location based on the wireless transceiver of the delivery location device detecting the courier device at the delivery location.

* * * * *